US007702799B2

(12) United States Patent
Belgaied et al.

(10) Patent No.: US 7,702,799 B2
(45) Date of Patent: Apr. 20, 2010

(54) METHOD AND SYSTEM FOR SECURING A COMMERCIAL GRID NETWORK OVER NON-TRUSTED ROUTES

(75) Inventors: Kais Belgaied, Sunnyvale, CA (US); Darrin P. Johnson, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 286 days.

(21) Appl. No.: 11/823,710

(22) Filed: Jun. 28, 2007

(65) Prior Publication Data

US 2009/0006620 A1 Jan. 1, 2009

(51) Int. Cl.
*G06F 13/00* (2006.01)
(52) U.S. Cl. .................. 709/227; 709/238; 709/229; 726/4
(58) Field of Classification Search ............. 709/227, 709/238, 226, 229; 726/1–6
See application file for complete search history.

(56) References Cited

U.S. PATENT DOCUMENTS

| 6,041,053 | A | 3/2000 | Douceur et al. |
| 6,070,219 | A | 5/2000 | McAlpine et al. |
| 6,163,539 | A | 12/2000 | Alexander et al. |
| 6,477,643 | B1 | 11/2002 | Vorbach et al. |
| 6,600,721 | B2 | 7/2003 | Edholm |
| 6,714,960 | B1 | 3/2004 | Bitar et al. |
| 6,757,731 | B1 | 6/2004 | Barnes et al. |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 7,046,665 | B1 | 5/2006 | Walrand et al. |
| 7,177,311 | B1 | 2/2007 | Hussain et al. |
| 7,260,102 | B2 | 8/2007 | Mehrvar et al. |

(Continued)

FOREIGN PATENT DOCUMENTS

EP 1 607 862 A 12/2005

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner*—Kenneth R Coulter
(74) *Attorney, Agent, or Firm*—Osha • Liang LLP (57) ABSTRACT

A method for securing a commercial grid network over non-trusted routes involves receiving, by an administrative node in the commercial grid network, a lease request from a client to lease one of multiple resource nodes in the commercial grid network, wherein the client is separated from the resource node by a non-trusted route. The method further involves transmitting, by the administrative node, a network security key associated with the client to the resource node, storing, by the resource node, the network security key in a network security key repository specific to the resource node, establishing, by the resource node, a secure network tunnel over the non-trusted route using the network security key, transmitting a network packet securely between the client and the resource node over the secure network tunnel, and destroying, by the resource node, the secure network tunnel when a lease term associated with the client and the resource node expires.

13 Claims, 5 Drawing Sheets

U.S. PATENT DOCUMENTS

| | | | |
|---|---|---|---|
| 7,313,142 | B2 | 12/2007 | Matsuo et al. |
| 2003/0037154 | A1 | 2/2003 | Poggio et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0278441 | A1* | 12/2005 | Bond et al. ............ 709/223 |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0174324 | A1 | 8/2006 | Zur et al. |
| 2008/0219239 | A1* | 9/2008 | Bell et al. ............ 370/351 |
| 2008/0256603 | A1* | 10/2008 | Belgaied et al. ........ 726/3 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

Tripathi, S.; "CrossBow: Network Virtualization and Resource Control"; presented at the Sun Labs Open House; Jun. 1, 2006; 24 pages.

CNAF: "On-Demand VPN support for Grid Applications" [Online] Oct. 1, 2004, XP002509846, Retrieved from the Internet: URL:http://www.cnat.infn.it./{ferrari/papers/myarticles/chep2004-vpn-v5.pdf> [retrieved on Jan. 12, 2009]; 4 pages.

Sun Microsystems: "Secure Application Management with the N1 Grid Service Provisioning System" [Online] Mar. 2004, XP002509847 Retrieved from the Internet: URL:http://www.sun.com/software/whitepapers/service_provisioning/GridServiceSecurityWP.pdf> [retrieved on Jan. 12, 2009]; 16 pages.

Datatag: "Demonstration of Advance Reservation and Services" [Online] Feb. 27, 2004, XP002509843 Retrieved from the Internet: URL:https://edms.cern.ch/file/431913/2/D2.5-1.5pdf> [retrieved on Jan. 12, 2009]; 34 pages.

Datagrid: "Definition of Architecture, Technical Plan and Evaluation Criteria for Scheduling, Resource Management, Security and Job Description" [Online] Sep. 14, 2001, XP002509844 Retrieved from the Internet: URL:https://edms.cern.ch/file/332413/1/datagrid-01-d1.2-0112-0-3.pdf> [retrieved on Jan. 12, 2009]; 30 pages.

M. Humphrey, M.R. Thompson, K. R. Jackson: "Security for Grids" [Online] Mar. 2005, XP002509845 Retrieved from the Internet: URL:http://ieeexplore.ieee.org/stamp/stamp.jsp?arnumber=01398017> [retrieved on Jan. 12, 2009]; 33 pages.

Anirban Chakrabarti: "Grid Network Security" Springer Berlin Heidelberg, [Online] May 26, 2007, XP002509887 ISBN: 978-3-540-44492-3 Retrieved from the Internet: URL:http://www.springerlink.com/content/x411p32313407330/fulltext.pdf> [retrieved on Sep. 12, 2009]; 9 pages.

European Search Report, dated Jan. 27, 2009; 4 pages.

* cited by examiner

METHOD AND SYSTEM FOR SECURING A COMMERCIAL GRID NETWORK OVER NON-TRUSTED ROUTES

CROSS-REFERENCE TO RELATED APPLICATIONS

Subject matter contained in the present document may be related to subject matter contained in copending U.S. patent application Ser. No. 11/786,541, entitled "Method and System for Securing a Commercial Grid Network," filed on Apr. 17, 2007, in the names of the same inventors and commonly owned by the same assignee, the entire contents of which are hereby incorporated by reference.

BACKGROUND

When computer systems are arranged in a network, security of data transferred between the computer systems can be of considerable concern, especially when the data is sensitive and/or proprietary. Specific security concerns may depend on the type(s) of network used (e.g., wireless, point-to-point, Ethernet, etc.), the type(s) of computer systems in the network (e.g., servers, workstations, mobile devices, integrated devices, etc.), and/or the types of applications executing on the computer systems (e.g., web servers, terminal servers, peer-to-peer applications, email servers, etc.). Those skilled in the art will appreciate that many different security concerns may affect security requirements in a computer network.

Security measures may be implemented from the physical layer all the way up to the application layer of the network. For example, at the physical layer, dedicated physical connections clearly provide stronger security than unencrypted wireless networks. Many of the network layers allow for some form of data encryption, which may be used to secure data regardless of the security provided by lower layers. Further, security may be implemented using packet filtering, firewalls, Virtual Private Networks (VPN), Secure Socket Layer (SSL), Wi-Fi Protected Access (WPA), antivirus suites, any other type of security feature, or any combination thereof. As noted above, the specific security features used may depend on many different security concerns.

One example of a security concern arises when three or more computer systems are connected in a network. In such arrangements, data sent by a first computer system may pass through a second computer system en route to a third computer system. If the second computer system is executing malicious code and the data is not adequately secured, the malicious code may be able to intercept the data and access its contents. This type of security concern is particularly relevant when the route between the first computer system and the second computer system is non-trusted.

SUMMARY

In general, in one aspect, the invention relates to a method for securing a commercial grid network over non-trusted routes. The method comprises receiving, by an administrative node in the commercial grid network, a lease request from a client to lease a first resource node selected from a plurality of resource nodes in the commercial grid network, wherein the client is separated from the first resource node by a first non-trusted route. The method further comprises transmitting, by the administrative node, a first network security key associated with the client to the first resource node, storing, by the first resource node, the first network security key in a network security key repository specific to the first resource node, establishing, by the first resource node, a first secure network tunnel over the first non-trusted route using the first network security key, transmitting a first network packet securely between the client and the first resource node over the first secure network tunnel, and destroying, by the first resource node, the first secure network tunnel when a lease term associated with the client and the first resource node expires.

In general, in one aspect, the invention relates to a commercial grid network. The commercial grid network comprises a plurality of resource nodes, and an administrative node configured to receive a lease request from a client to lease a first resource node selected from the plurality of resource nodes, wherein the client is separated from the first resource node by a first non-trusted route, and transmit a first network security key associated with the client to the first resource node. The first resource node is configured to store the first network security key in a network security key repository specific to the first resource node, establish a first secure network tunnel over the first non-trusted route using the first network security key, receive a first network packet securely from the client over the first secure network tunnel, and destroy the first secure network tunnel when a lease term associated with the client and the first resource node expires.

In general, in one aspect, the invention relates to a computer readable medium. The computer readable medium comprises executable instructions to receive, by an administrative node in a commercial grid network, a lease request from a client to lease a first resource node selected from a plurality of resource nodes in the commercial grid network, wherein the client is separated from the first resource node by a first non-trusted route. The computer readable medium further comprises executable instructions to transmit, by the administrative node, a first network security key associated with the client to the first resource node, store, by the first resource node, the first network security key in a network security key repository specific to the first resource node, establish, by the first resource node, a first secure network tunnel over the first non-trusted route using the first network security key, transmit a first network packet securely between the client and the first resource node over the first secure network tunnel, and destroy, by the first resource node, the first secure network tunnel when a lease term associated with the client and the first resource node expires.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for securing a commercial grid network over non-trusted routes. In one or more embodiments of the invention, resource nodes in the commercial grid network are leased to clients. When a resource node located over a non-trusted route is leased to a client, a secure network tunnel is established over the non-trusted route, thereby securing communications between the client and the resource node.

A grid network (or "computational grid") is a group of communicatively coupled computer systems in which computing resources are treated as manageable entities. Specifically, computing resources or combinations thereof may be discoverable, accessible, and/or manageable via defined networking protocols. Management of computing resources may include life cycle management, partitioning, allocation, division, etc. In one or more embodiments of the invention, management of computing resources is performed in accordance with service level agreements (SLAs) between grid owners and grid clients.

Specifically, in this context, the grid network is referred to as "commercial" because of the ability for clients to lease resource nodes from the grid network. In other words, leasing resource nodes is a type of commercial transaction. Further, "leasing" does not necessarily imply a financial transaction. For example, a client may gain access to a resource node in exchange for contributing resources of its own to the grid network. As another example, a client may gain access to a resource node as part of a broader business agreement. Thus, in this context, "leasing" merely implies a transaction in which a party (i.e., the client) gains access to a resource node from the commercial grid network for a limited period of time.

Figure 1:
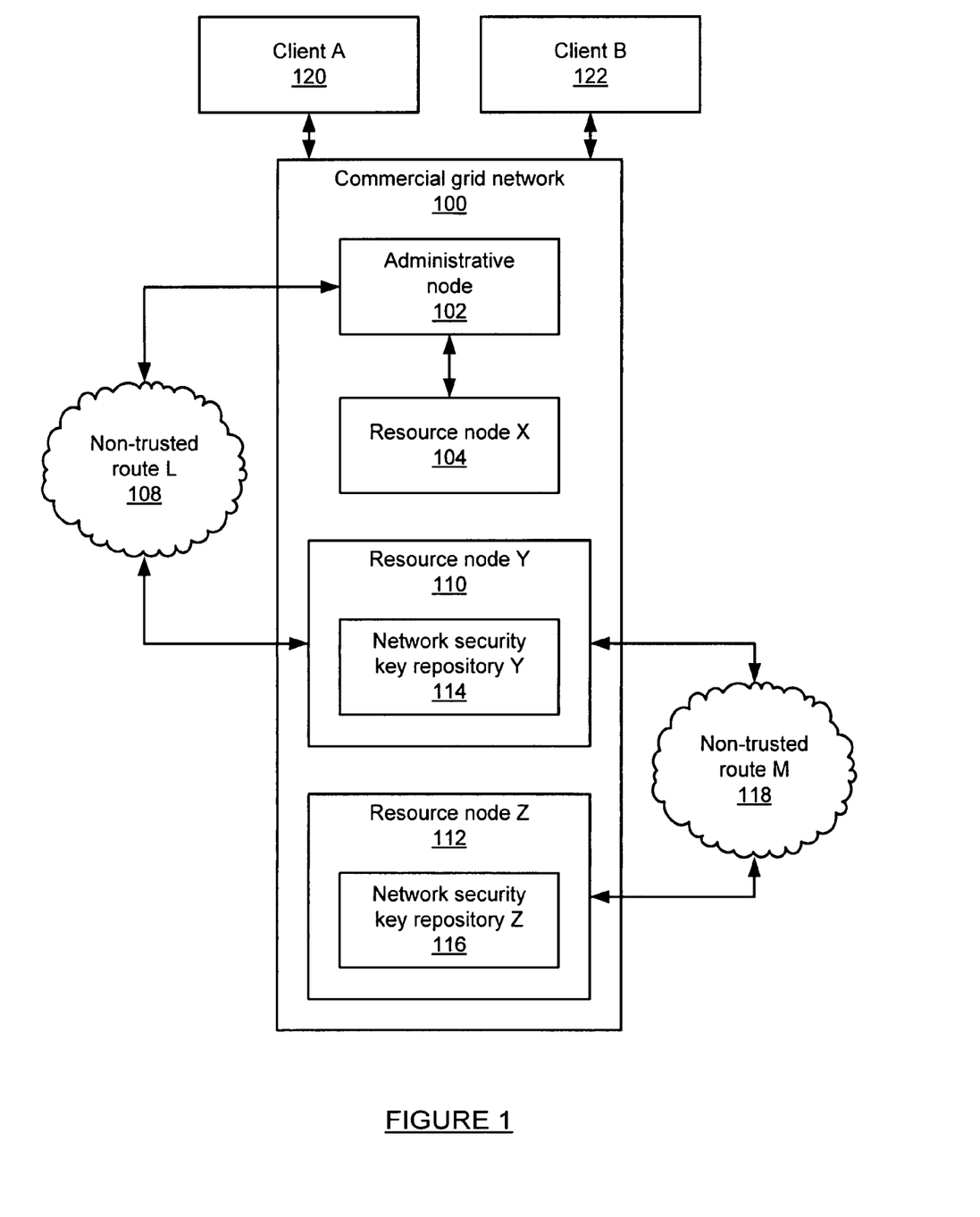
FIG. 1 shows a diagram of a system in accordance with one or more embodiments of the invention.

FIG. 1 shows a diagram of a system in accordance with one or more embodiments of the invention. The system includes a commercial grid network (100) configured to lease resource nodes (e.g., resource node X (104), resource node Y (110), resource node Z (112)) to clients (e.g., client A (120), client B (122)). Specifically, the commercial grid network (100) is configured to lease computing resources (not shown) hosted by the resource nodes to clients. Leased computing resources may include data storage capacity, processing cycles, network bandwidth, any other type of leasable computing resource, or any combination thereof. The clients may be any type of computer system configured to communicate with the commercial grid network (100) and transmit requests to access leased resource nodes.

Further, the resource nodes may include storage servers, tightly-coupled and/or loosely-coupled multiprocessor computer systems, web servers, network switches, proxy servers, any other type of computer system configured to host computing resources for leasing, or any combination thereof. Further, one or more of the resource nodes may host multiple computing resources, and multiple computing resources may be leased independently and/or as a group. In one or more embodiments, blade servers are used as resource nodes to extend computing capacity of the commercial grid network (100) with minimal physical space requirements.

In one or more embodiments, the computing resources may include virtualized computing resources. Specifically, one or more of the computing resources may provide a level of abstraction to underlying computing resources. For example, the underlying computing resources may be aggregated, spanned, or otherwise combined to form one or more virtual computing resources. Alternatively, a single underlying computing resource may be partitioned into multiple virtual computing resources. Further, one or more of the computing resources may be hosted on a virtual machine, i.e., a virtual computer system consisting wholly of virtual computing resources.

In one or more embodiments, the commercial grid network (100) is distributed across a network that includes non-trusted routes (e.g., non-trusted route L (108), non-trusted route M (118)). Non-trusted routes are routes in which the security of the physical layer is not known. Therefore, for secure communications, non-trusted routes require additional security included in network protocols. For example, the commercial grid network (100) may include some nodes that are located in a physically secured local area network, while other nodes may be accessible only via the Internet. Those skilled in the art will appreciate that the Internet and other similar distributed networks inherently include many non-trusted routes.

For example, in FIG. 1, an administrative node (102) is communicatively coupled with resource node X (104) via a trusted route, i.e., a route that is secured at the physical layer. However, the administrative node (102) is also communicatively coupled with resource node Y (110) via non-trusted route L (108). Further, resource nodes may be communicatively coupled with each other via non-trusted routes. For example, resource node Y (110) is communicatively coupled with resource node Z (112) via non-trusted route (118).

In one or more embodiments, communication over non-trusted routes is secured using secure network tunnels. Network tunnels are arrangements between computer systems to communicate using a tunneling protocol layered on top of a standard network protocol. If the tunneling protocol includes some sort of cryptographic function (e.g., encryption, message authentication codes (MAC), etc.), then the network tunnel may be considered secure. For example, secure shell (SSH) tunneling is commonly used to securely issue commands to a remote computer system, e.g., via a command prompt. Those skilled in the art will appreciate that many different tunneling protocols exist, having varying levels of security. In one or more embodiments of the invention, Internet Protocol Security (IPsec) is used to establish secure network tunnels.

Continuing with discussion of FIG. 1, as noted above, the commercial grid network (100) may include an administrative node (102). In one or more embodiments, the administrative node (102) is configured to manage grid enrollment for clients—e.g., authenticating clients to use the commercial grid network (100) and/or choosing which resource nodes to allocate in response to lease requests from clients. Further, the administrative node (102) may be configured to coordinate the establishment of secure network tunnels, either between itself and resource nodes, between clients and resource nodes, and/or between one resource node and another resource node. Although a single administrative node (102) is shown in FIG. 1, the commercial grid network (100) may include multiple administrative nodes.

In one or more embodiments, resource nodes located over non-trusted routes include network security key repositories (e.g., network security key repository Y (114), network security key repository Z (116)). Other nodes (e.g. the administrative node (102), clients, and/or resource node X (104)) may also include network security key repositories (not shown). The network security key repositories are configured to store one or more network security keys (not shown) for use when establishing secure network tunnels. Specifically, the network security keys may be public and/or pre-shared keys (PSK) used to mutually authenticate communications between nodes.

The network security key repositories may be any type of storage location configured to store network security keys. For example, the network security key repositories may be databases, extensible markup language (XML) files, plain text files, any other type of storage location, or any combination thereof. Those skilled in the art will appreciate that many different ways of storing data exist.

Figure 2A:
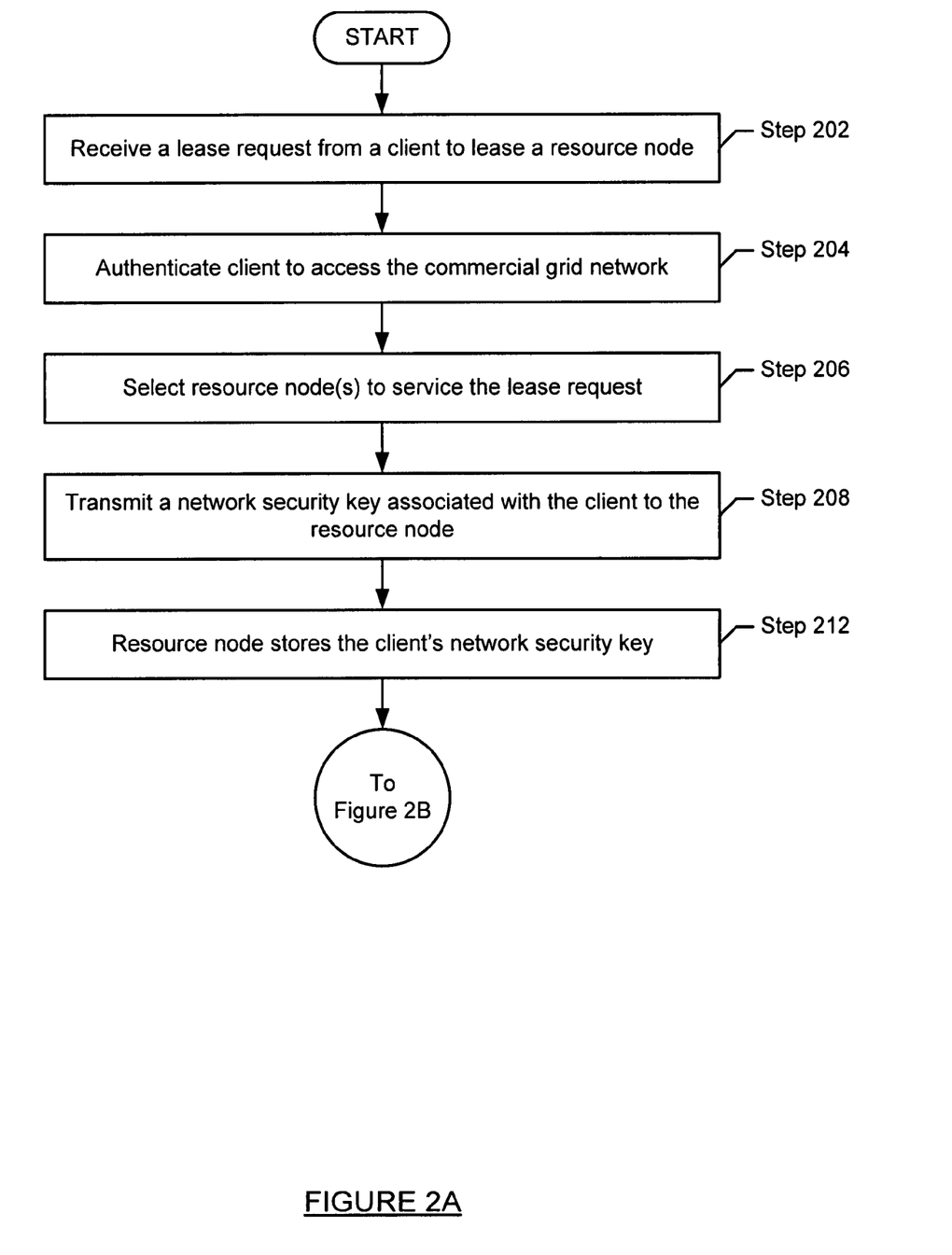
FIGS. 2A-2B show a flowchart of a method for securing a commercial grid network in accordance with one or more embodiments of the invention.
Figure 2B:
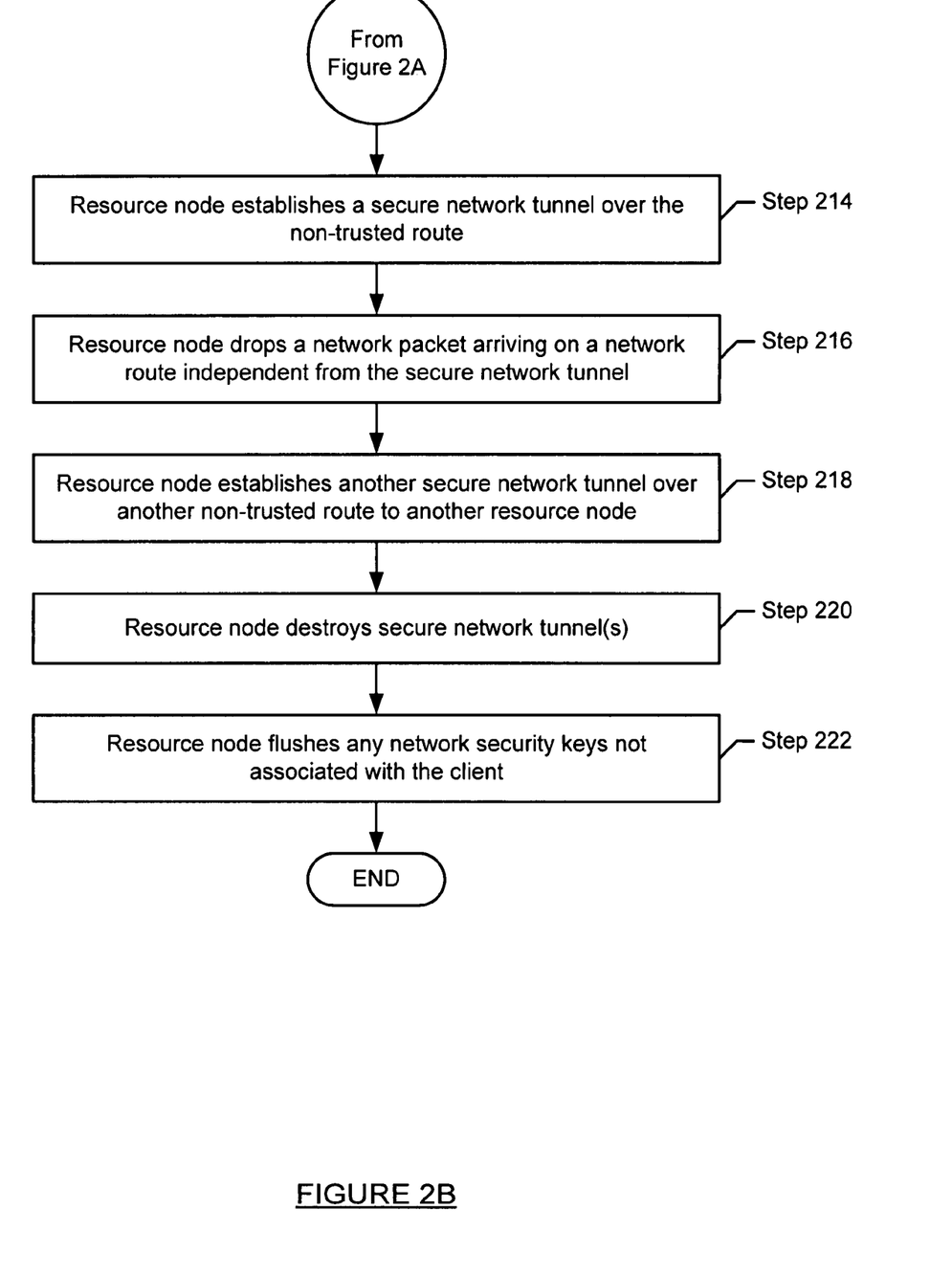

FIGS. 2A-2B show a flowchart of a method for securing a commercial grid network in accordance with one or more embodiments of the invention. In one or more embodiments, one or more of the steps shown in FIGS. 2A-2B may be omitted, repeated, and/or performed in a different order than that shown in FIGS. 2A-2B. Accordingly, the specific arrangement of steps shown in FIGS. 2A-2B should not be construed as limiting the scope of the invention.

Initially, in Step 202, a lease request is received from a client of the commercial grid network. In one or more embodiments, the lease request may include details about the type of computing resource(s) requested, such as a number of central processing unit (CPU) hours, a number of gigabytes (GB) of storage, a number of ports to reserve on a switch, or any other type of computing resource metric, or any combination thereof. Further, the lease request may specify a term of the lease, i.e., a range of dates and/or times during which the computing resource(s) are to be leased. In one or more embodiments, the lease request is received by an administrative node in the commercial grid network.

In one or more embodiments, prior to servicing the lease request, the client itself is authenticated to access the commercial grid network (Step 204). In such scenarios, the lease request may include login credentials and authenticating the client may involve comparing the login credentials to a database of authorized login credentials. Further, if the lease request includes payment information (e.g., a credit card number), authenticating the client may involve confirming that the payment information is valid.

In Step 206, one or more resource nodes are chosen to service the client's lease request. For example, the administrative node may attempt to locate a resource node hosting the type and capacity of computing resource(s) requested. In some cases, computing resources on multiple resource nodes may be combined to collectively satisfy the criteria specified in the lease request. In one or more embodiments, the computing resource(s) are then removed from the pool of available resources in the commercial grid network.

In one or more embodiments, a selected resource node is located over a non-trusted route. Accordingly, to initiate establishment of a secure network tunnel, a network security key associated with the client may be transmitted to the resource node (Step 208). The network security key may be transmitted by the client, or may be transmitted by the administrative node. In one or more embodiments, the network security key is transmitted as part of a Diffie-Hellman key exchange during Internet Key Exchange (IKE) negotiation for establishing an IPsec tunnel.

As noted above, the resource node may include a network security key repository. In one or more embodiments, in Step 212, the resource node stores the client's network security key in the network security key repository. Storing the client's network security key allows the resource node to reference the network security key as needed, e.g., when sending or receiving packets to/from the client.

In one or more embodiments, in Step 214, the resource node establishes a secure network tunnel with the client over the non-trusted route. In one or more embodiments, the secure network tunnel bypasses the administrative node completely. Alternatively, the secure network tunnel may be required to pass through the administrative node. For added security, in one or more embodiments, the secure network tunnel is restricted to a specific network protocol (e.g., User Datagram Protocol (UDP), Transmission Control Protocol (TCP), Hypertext Transfer Protocol (HTTP), File Transfer Protocol (FTP), or any other sort of network protocol) and/or a specific port utilized by the client.

The specific process of establishing the secure network tunnel depends on the type of secure network tunnel being used. For example, as noted above, when using IPsec, an IKE negotiation may be used to exchange network security keys. Accordingly, establishing the secure network tunnel may involve completing the IPsec configuration process. Embodiments of the invention may be implemented using many different types of secure network tunnels (e.g., Point-to-Point Tunneling Protocol (PPTP), Generic Routing Encapsulation (GRE), Teredo, Secure Shell (SSH), Transport Layer Security (TLS), or any other sort of secure network tunneling).

In one or more embodiments, once the secure network tunnel is established, the resource node does not accept any requests to access computing resources unless those requests are communicated via the secure network tunnel. Accordingly, in Step 216, the resource node drops a network packet arriving on a network route independent from the secure network tunnel. Dropping the network packet may involve simply ignoring the network packet, or may involve responding to the network packet with an error message. In any case, the resource node does not process any access requests included in the network packet. As noted above, exceptions may be made for administrative packets.

In one or more embodiments, the commercial grid network may include functionality for resource nodes to communicate with each other. For example, multiple resource nodes allocated to a client may be presented to the client as a single resource pool. If any of the resource nodes are located over a non-trusted route, secure network tunnels may be used to secure communications between the resource nodes.

Specifically, in Step 218, the resource node may establish a second secure network tunnel (i.e., separate from the secure network tunnel established with the client) over a second non-trusted route to a second resource node. The term "second" is used here merely to distinguish between resource nodes. Further, the second non-trusted route may overlap the first non-trusted route, i.e., have network "hops" in common with the first non-trusted route. In one or more embodiments, establishing the second secure network tunnel involves receiving and storing a network security key for the second resource node, similar to the client-based process described above. See, e.g., Steps 208-212.

In one or more embodiments, the commercial grid network may be configured to allocate resource nodes to the client when a utilization threshold of existing allocated resource nodes is satisfied. For example, another resource node may be allocated to the client when processor utilization exceeds a given threshold, when hard disk usage exceeds a given threshold, etc. Those skilled in the art will appreciate that other utilization thresholds may be used. Accordingly, Step 218 may be performed as resource nodes are dynamically allocated to the client, if those resource nodes are located over a non-trusted network. Further, if multiple resource nodes are allocated for a client, the administrative node may generate a multicast group for communicating with all of the allocated nodes simultaneously.

In one or more embodiments, in Step 220, secure network tunnel(s) established in association with the client's lease request are destroyed. For example, a term of the lease request may expire, and the client may no longer be authorized to access the resource node(s). Once the secure network tunnel(s) are destroyed, the resource node(s) may drop any subsequent access requests from the client. Thus, embodiments of the invention allow for a client to securely access resource nodes only for a predetermined amount of time.

In one or more embodiments, in Step 222, the resource node flushes (i.e., deletes or otherwise disables) the client's network security key from the network security key repository. Although not required, flushing the client's network security key ensures that subsequent lessees of the resource node are not able to access lingering session state data associated with the client. Specifically, if the client's network security key is not flushed, then a subsequent lessee may be able to use the network security key to access encrypted communications from the client and/or confidential data remaining in memory of the resource node. Thus, flushing the client's network security key ensures that such communications and data remain securely encrypted.

Figure 3A:
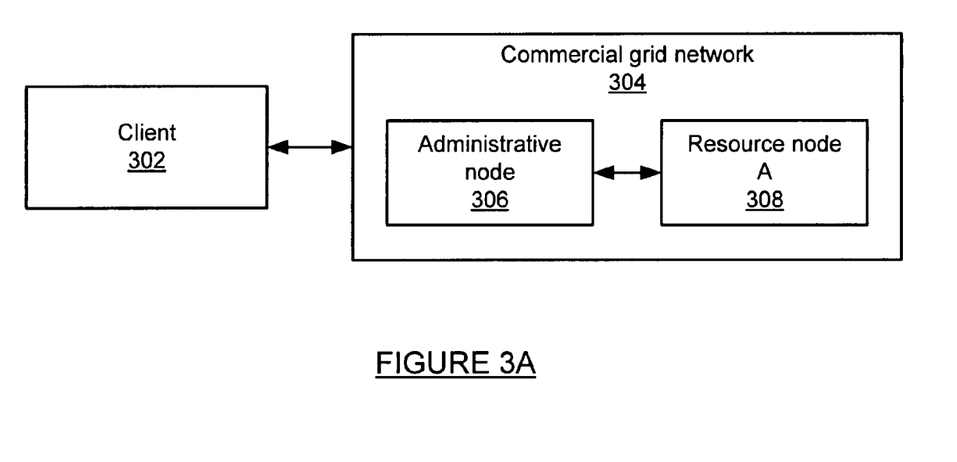
FIGS. 3A-3B show diagrams of an example of securing a commercial grid network in accordance with one or more embodiments of the invention.
Figure 3B:
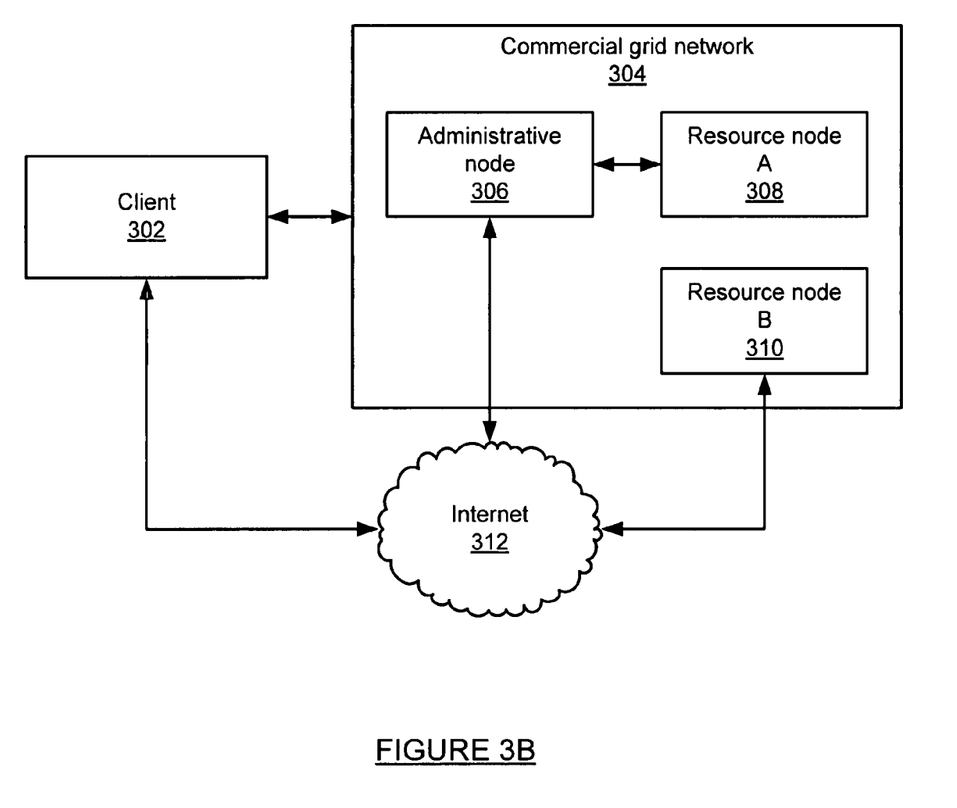

Referring now to FIGS. 3A-3B, the following describes an example of securing a commercial grid network in accordance with one or more embodiments of the invention. Initially, as shown in FIG. 3A, a client (302) requests access to a commercial grid network (304). In this example, the access request includes a request to lease computing resources from the commercial grid network. An administrative node (306) receives the request and authenticates the client (302).

Once the client (302) is authenticated, the administrative node (306) consults a table (not shown) of available resource nodes hosting the requested computing resources. Based on the table, the administrative node (306) allocates resource node A (308) for access by the client (302). In this example, the administrative node (306) and resource node A (308) are located within a physically secure local area network (LAN). Nonetheless, one or more forwarding nodes situated between the administrative node (306) and resource node A (308) may not be trusted nodes. Thus, in one or more embodiments, communications between the administrative node (306) and the resource node A (308) are secured using techniques described in copending U.S. patent application Ser. No. 11/786,541, entitled "Method and System for Securing a Commercial Grid Network," filed on Apr. 17, 2007, in the names of the same inventors and commonly owned by the same assignee, the entire contents of which were incorporated by reference above.

In FIG. 3B, resource A (308) has satisfied a utilization threshold for the leased computing resources. Accordingly, the administrative node (306) consults the table of available resources and selects resource node B (310) as an additional node to service the client's (302) lease request. In this example, neither the administrative node (306) nor the client (302) can access resource node B (310) without passing through the Internet (312). Accordingly, the administrative node (306) transmits a network security key associated with the client (302) to resource node B (310). In response, resource node B (310) stores the client's (302) network security key in its network security key repository (not shown). Then, using the client's (302) network security key, resource node B (310) establishes a secure network tunnel to the client (302), over the Internet (312).

Depending on the client's (302) request and/or the type of computing resource being leased, resource node B (310) may also establish a secure network tunnel to resource node A (308), via the same route or a different route. Any packets received by resource node B (310) from other clients (not shown) are dropped as long as the secure network tunnel(s) is/are operable. The secure network tunnel(s) is/are finally destroyed once the client's (302) lease is terminated. Further, the client's (302) network security key may be flushed from resource node B's (310) network security key repository to protect any lingering session state data associated with the client (302).

One or more embodiments of the invention allow communication in a commercial grid network to be secured using secure network tunnels. Specifically, one or more embodiments of the invention allow for a commercial grid network to be extended over non-trusted routes without compromising data security.

Figure 4:
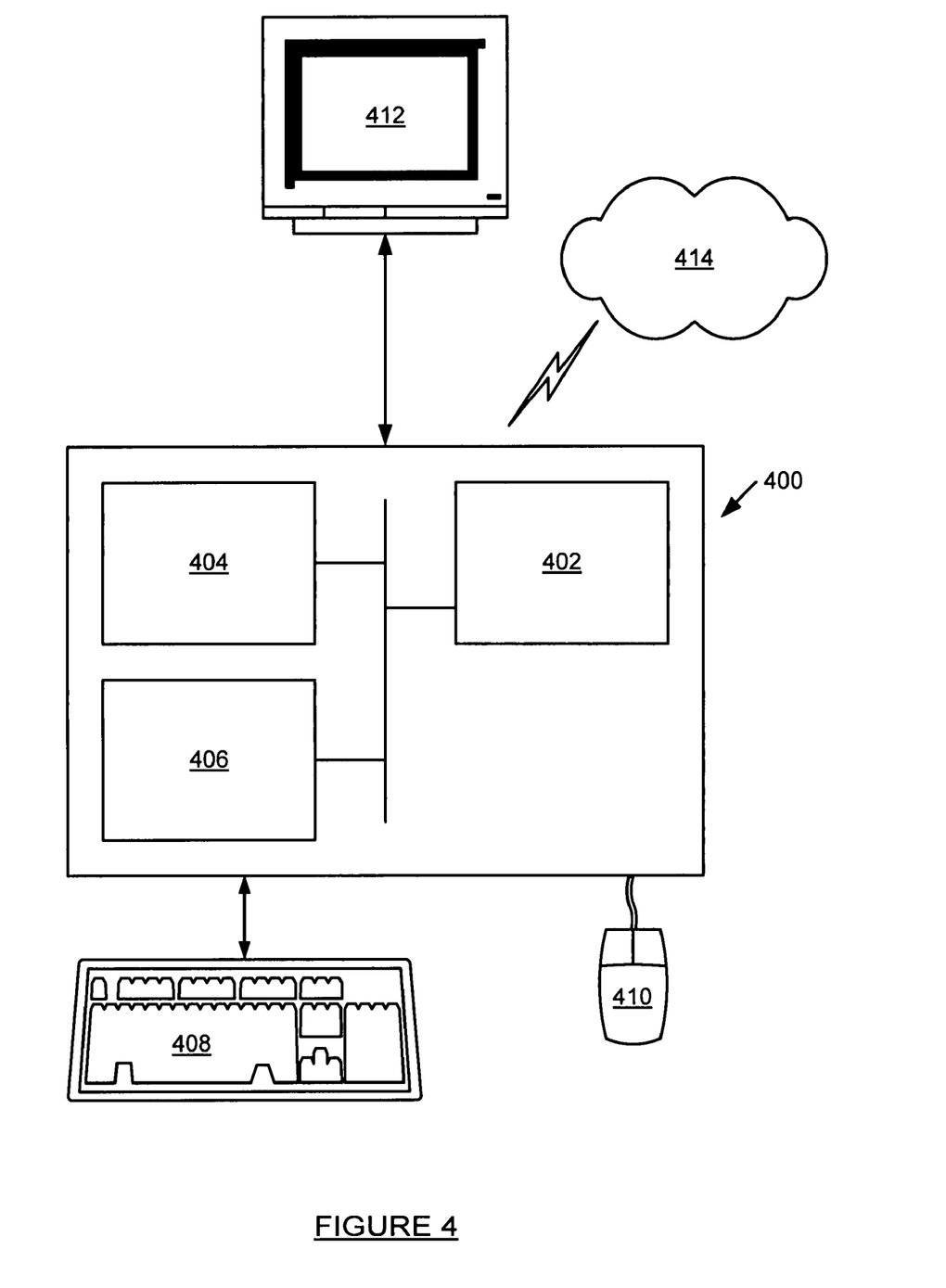
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., client, administrative node, resource node, network security key repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A commercial grid network comprising:
   a plurality of resource nodes, wherein each resource node in the plurality of resource nodes comprises a processor; and
   an administrative node comprising a processor and a computer readable medium, wherein the computer readable medium comprises instructions, which when executed by the processor, perform a method, the method comprising:

receiving a lease request from a client to lease a first resource node selected from the plurality of resource nodes, wherein the client is separated from the first resource node by a first non-trusted route, and transmitting a first network security key associated with the client to the first resource node, wherein the first resource node is configured to:

store the first network security key in a network security key repository specific to the first resource node, establish a first secure network tunnel over the first non-trusted route using the first network security key, receive a first network packet securely from the client over the first secure network tunnel, and destroy the first secure network tunnel when a lease term associated with the client and the first resource node expires.

2. The commercial grid network of claim 1, wherein the first resource node is further configured to:

store a second network key in the network security key repository;

wherein the second network key is associated with a second resource node selected from the plurality of resource nodes, and wherein the second resource node is separated from the first resource node by a second non-trusted route;

establish a second secure network tunnel over the second non-trusted route using the second network security key;

receive a second network packet securely from the second resource node over the second secure network tunnel; and destroy the second secure network tunnel when the lease term expires.

3. The commercial grid network of claim 2, wherein the method further comprises:

generating a multicast group for communicating with the first resource node and the second resource node.

4. The commercial grid network of claim 1, wherein the first resource node is further configured to:

drop a second network packet arriving on a network route independent from the first secure network tunnel.

5. The commercial grid network of claim 1, wherein the first resource node is further configured to:

flush the first network security key from the network security key repository when the lease term expires.

6. The commercial grid network of claim 1, wherein the first secure network tunnel is restricted to at least one selected from the group consisting of a specific protocol utilized by the client and a specific port utilized by the client.

7. A computer readable medium comprising executable instructions to:

receive, by an administrative node in a commercial grid network, a lease request from a client to lease a first resource node selected from a plurality of resource nodes in the commercial grid network, wherein the client is separated from the first resource node by a first non-trusted route;

transmit, by the administrative node, a first network security key associated with the client to the first resource node;

store, by the first resource node, the first network security key in a network security key repository specific to the first resource node;

establish, by the first resource node, a first secure network tunnel over the first non-trusted route using the first network security key;

transmit a first network packet securely between the client and the first resource node over the first secure network tunnel; and destroy, by the first resource node, the first secure network tunnel when a lease term associated with the client and the first resource node expires.

8. The computer readable medium of claim 7, further comprising executable instructions to:

store, by the first resource node, a second network key in the network security key repository, wherein the second network key is associated with a second resource node selected from the plurality of resource nodes, and wherein the second resource node is separated from the first resource node by a second non-trusted route;

establish a second secure network tunnel over the second non-trusted route using the second network security key;

transmit a second network packet securely between the first resource node and the second resource node over the second secure network tunnel; and destroy the second secure network tunnel when the lease term expires.

9. The computer readable medium of claim 8, further comprising executable instructions to:

generate, by the administrative node, a multicast group for communicating with the first resource node and the second resource node.

10. The computer readable medium of claim 8, wherein establishing the second secure network tunnel is performed when a utilization threshold of the first resource node is satisfied.

11. The computer readable medium of claim 7, further comprising executable instructions to:

drop, by the first resource node, a second network packet arriving on a network route independent from the first secure network tunnel.

12. The computer readable medium of claim 7, further comprising executable instructions to:

flush, by the first resource node, the first network security key from the network security key repository when the lease term expires.

13. The computer readable medium of claim 7, wherein the first secure network tunnel is restricted to at least one selected from the group consisting of a specific protocol utilized by the client and a specific port utilized by the client.

* * * * *

UNITED STATES PATENT AND TRADEMARK OFFICE
CERTIFICATE OF CORRECTION

| | | |
|---|---|---|
| PATENT NO. | : 7,702,799 B2 | Page 1 of 1 |
| APPLICATION NO. | : 11/823710 | |
| DATED | : April 20, 2010 | |
| INVENTOR(S) | : Kais Belgaied et al. | |

It is certified that error appears in the above-identified patent and that said Letters Patent is hereby corrected as shown below:

Title page, item [56] on page 2, in column 2, under "Other Publications", line 8, delete "www.cnat." and insert -- www.cnaf. --, therefor.

Signed and Sealed this
Twelfth Day of April, 2011

David J. Kappos
*Director of the United States Patent and Trademark Office*